US005800894A

United States Patent [19]

Navis

[11] Patent Number: 5,800,894

[45] Date of Patent: Sep. 1, 1998

[54] MASKING DEVICE WITH HANDLE

[75] Inventor: Glen E. Navis, Waupun, Wis.

[73] Assignee: Brunswick Corporation, Lake Forest, Ill.

[21] Appl. No.: 939,342

[22] Filed: Sep. 28, 1997

[51] Int. Cl.[6] .......... B32B 9/00

[52] U.S. Cl. .......... 428/41.7; 428/40.1; 428/41.1; 428/124; 428/192; 428/202; 428/343; 156/202; 156/554; 118/504; 118/505; 52/211

[58] Field of Search .......... 428/41.7, 124, 428/192, 202, 343, 121, 41.1, 40.1; 156/554, 202; 52/211; 118/504, 505, 301

[56] References Cited

U.S. PATENT DOCUMENTS

| | | | |
|---|---|---|---|
| 4,075,053 | 2/1978 | Adams | 156/391 |
| 4,511,427 | 4/1985 | Karliner | 156/523 |
| 5,037,501 | 8/1991 | Lawson | 156/527 |
| 5,098,786 | 3/1992 | Hanke | 428/343 |
| 5,468,538 | 11/1995 | Nameche | 428/101 |
| 5,654,055 | 8/1997 | Cox et al. | 428/41.7 |

OTHER PUBLICATIONS

Catalog of the Shercon Company, 1823 San Fernando Rd., Los Angeles, CA 90065.

Catalog of the Echo Corporation, 1026 Hanson Ct., Milpitas, CA 95035.

*Primary Examiner*—William Krynski
*Assistant Examiner*—Abraham Bahta
*Attorney, Agent, or Firm*—William D. Lanyi

[57] ABSTRACT

A masking device is produced by folding a first material to form a pleat that serves as an extension or handle, for the device. By folding the first sheet of material at three fold lines, a pleat is formed. If the piece of material is coated with adhesive prior to the folding process, two adhesive-coated surfaces will face each other within the body of the pleat, helping to attach two segments of the pleat together to form a more permanent and more rigid extension. The extension, or handle, extends from an unfolded portion of the first piece of material and facilitates the removal of the masking device from either a backing sheet or a surface which is protected by the masking device. The handle also facilitates the application of the masking device to the surface to be protected.

17 Claims, 5 Drawing Sheets

MASKING DEVICE WITH HANDLE

BACKGROUND OF THE INVENTION

1. Field of the Invention

The present invention is generally related to masking devices used to protect surfaces during painting and other manufacturing processes and, more particularly, to a masking device with a handle extending therefrom to facilitate gripping the device for placement and removal.

2. Description of the Prior Art

Various types of masking materials, in the form of tape or patches, have been used to protect preselected portions of surfaces during painting or treating processes. Perhaps the most common application of a masking device is the use of masking tape during a painting process to protect surfaces that are not intended to be painted. Masking devices are also used during other coating or anodizing processes.

In certain manufacturing operations, products are machined prior to painting. It is undesirable to allow paint to adhere to the machined surfaces. In addition, drilled and tapped holes are commonly formed prior to painting. If the paint is allowed to enter the drilled or tapped holes, significant effort is typically required to remove the paint from the holes before completion of the manufacturing process. In order to prevent the paint or other coatings from adhering to machined surfaces, it is very common to use a sheet of masking material to cover and protect the machined surfaces or holes prior to the painting or coating process. Masking tape and sheets are available in many different shapes and sizes, typically made to suit specific operations. A catalog of the Shercon Company describes many different types of masking devices. It illustrates custom masks that can be used for powder coating, painting, electro-plating, and anodizing. Some masking tapes are impregnated crepe masking paper that are able to withstand temperatures in excess of 300 deg. F. The same material can be used for masking discs. Some discs are specifically made for chrome, cadmium, nickel-plating, chemical milling patchwork and as a general moisture resistant barrier. These discs can be made of lead foil, Teflon, which is impervious to most chemicals and withstands temperatures in excess of 400 deg. F. for three hours, aluminum foil and other materials. The discs are often provided with an acrylic adhesive or a silicon adhesive. Some tapes and masking discs can be made of Kapton material or polymide material. Some tapes and masking discs are approximately 0.001 inch thick and the silicon adhesion can be approximately 0.0015 inches thick. Certain tapes and masking discs are available with a 0.0015 inch thick polyester backing and a silicon adhesive.

A catalog published by Echo Corporation describes masking tapes and discs made of green polyester which is 0.002 inches thick and has a 0.0015 inch thick silicon adhesive. In addition, a woven fiberglass tape, coated with a high temperature silicon adhesive, is available.

Virtually any material that can be provided in sheet form is possible for use in making masking tapes and masking discs. These materials are often cut to suit specific patterns and shapes so that the masking device covers the area to be protected, but does not cover any additional area that is intended to be painted or otherwise treated.

The application and removal of masking tape devices requires time during the manufacturing process and therefore represents an expense factor in the total cost of the product being manufactured. Several techniques and devices have been developed to facilitate the application of masking devices.

U.S. Pat. No. 5,468,538, which issued to Nameche on Nov. 21, 1995, discloses a paint masking kit for windows and a method for using the kit. The kit is intended for masking windows prior to painting. It includes a container having a plurality of reusable window valance covers having predetermined sizes and shapes for covering a header and valance portion of the window and a predetermined amount of plastic sheet materials for covering the glass portions of the window. The method of paint masking a window, having an upper and lower sash portion, a header and valance portion, includes raising the lower sash portion to expose the lower half of the valances. The reusable window valance covers are then secured to the exposed valance portions, and the lower sash portion is lowered over the window valance covers. Next, the upper sash portion is lowered to expose the header and the upper half of the valances. Reusable window valance covers are secured to the exposed header and valance portions, and the upper sash portion is raised over the window valance covers. Lastly, the plastic sheet material is applied over glass portions of the window.

U.S. Pat. No. 5,037,501, which issued to Lawson on Aug. 6, 1991, describes a hand held masking machine. The machine has a sheet material housing on which is rotatably supported a paper roll and a pair of adhesive tape rolls. One tape roll dispenses adhesive tape to overlap a portion of one edge of the paper roll with the other tape roll dispensing adhesive tape to overlap a portion of the opposite edge of the paper roll. The front edge of the housing is formed into a cutting blade which is to be manually used to cut through the paper roll once the desired extended length has been obtained with this cutting also occurring through the tape that is secured to the side edges of the paper roll.

U.S. Pat. No. 4,511,427, which issued to Karliner et al on Apr. 16, 1985, discloses a masking tape applicator. The hand held tape dispenser and applicator has a light weight plastic material housing with a hollow hub at one end mounting an exposed roll of pressure sensitive adhesive tape and a hand grasped hollow finger extending from the hub to a dispensing outlet where a feed roll receives the adhesive foil of the tape and directs the opposite tape to a fresh roll for applying the tape to a surface. A thumb operated slidable trigger on the top of the finger selectively rocks a cutter head over the press roll to sever the dispensing tape. The housing is longitudinally split with the two mating components snap fitted together and easily pulled apart to insert the tape roll and thread the tape over the feed roll. A belt clip receives the hollow hub permitting the applicator to be releasably suspended from the waist belt of the user.

U.S. Pat. No. 4,075,053, which issued to Adams on Feb. 21, 1978, describes a masking tape applicator for pipe. The device applies a strip of masking tape to a pipe, particularly the inside surface of the pipe. A frame carries a pair of rollers which roll along the inside pipe surface. The tape is mounted on a reel and is unwound in a strip which is pressed against the inside of the pipe surface by the rollers. An outer guide roller is carried on a hand lever assembly and is biased against the outside surface of the pipe in order to maintain the inner rollers against the inside surface of the pipe. The hand lever may be pulled away from the pipe to disengage the outer roller therefrom for removal of the applicator device from the pipe.

Masking tape and masking discs made according to the prior art present two significant difficulties. First, when the discs or tape is to be removed from its backing sheet, it is sometimes difficult to begin to peel the edge of the disc or tape in order to begin the removal from the backing sheet. Secondly, after the masking tape or disc is applied to a device and the painting or coating operation is finished, the masking device must be removed in order to permit further processing of the product. Once again, an operator must lift an edge of the masking tape or disc away from the surface to which it is adhered in order to grasp the masking device and remove it. This necessary process of raising an edge of the masking device in order to permit an appropriate grasping of the device for removal, either from its backing sheet or from the painted or coated object on which it was used, is sometimes very difficult to perform. This removal process therefore takes valuable manufacturing time and can increase the cost of the product being manufactured.

For the reasons described above, it would be significantly beneficial if a masking disc could be provided which is easily grasped for removal, either from its backing sheet or from the surface on which it was placed for protection of that surface.

SUMMARY OF THE INVENTION

A masking device made in accordance with the present invention comprises a first piece of material having an adhesive attached to a first surface thereof. Most typically, the first piece of material is a sheet of paper, polyester, vinyl, lead foil, aluminum foil, or other material which is capable of covering a surface to protect it from a process, such as painting or coating. The present invention further comprises an extension which is attached to the first piece of material for allowing the masking device to be grasped. The extension serves as a handle which an operator can grip between two fingers for the purpose of lifting the first piece of material away from either a backing sheet or a surface to which it was attached.

Masking discs in accordance with the prior art are flat sheets of material with an adhesive coating on one side. When applied to a backing sheet for storage or to a surface which is to be protected, the masking device lies completely flat and virtually co-planar with the surface of the backing sheet to which it is attached. In order to lift the masking disc away from the surface to which it is attached, an operator typically has to use a finger nail or some other object to pry up an edge or corner of the disc in order to start the removal process. This tedious process is sometimes very difficult. The handle, or extension, of the present invention simplifies this procedure and allows the masking disc to be quickly and easily removed from a surface to which it is adhered.

The first piece of material can be folded to form a pleat that extends from the unfolded portion of material. As will be described in greater detail, the pleat is formed by folding the first piece of material at three fold lines to create the extension that serves as a handle by extending away from the planer surface of the unfolded portion of the first piece of material. In order to store and ship the masking device of the present invention, it is typical to attach the adhesive surface of the first piece of material to a second piece of material which serves as a backing sheet. The backing sheet can be made of several types of paper which allow the adhesive to adhere temporarily to the backing sheet, but also permit easy removal of the masking device when it is intended to be used. The backing sheet used in conjunction with the present invention can be identical in all respects to the various types of backing sheets used in the prior art.

The first piece of material can be polyester, paper, lead foil, aluminum foil, Teflon, or any other suitable material. The adhesive can be a silicon adhesive or any other suitable adhesive. In most applications, the first piece of material is a generally planer sheet, but it should be understood that the sheet does not have to be flat in all instances. In addition, the handle, or extension, is typically made by folding the first piece of material to form a pleat. Therefore, the first piece of material and the extension are made from an integral sheet of the same material. This characteristic makes the manufacturing of the present invention more efficient, but it is not necessary in all applications. It should be understood that the extension can be a separate piece of material that is attached to the first piece of material to serve as a handle.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
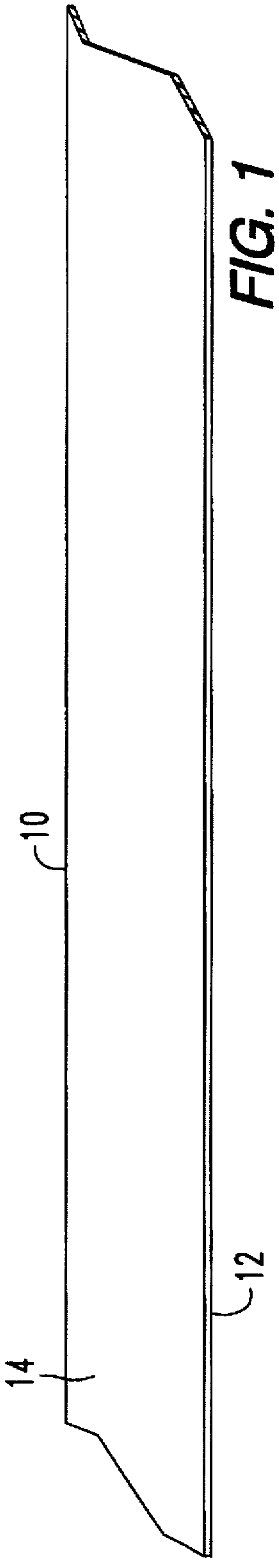
FIGS. 1, 2 and 3 show successive stages of a pleat being formed by folding a strip of material.

Throughout the description of the preferred embodiment, like components will be identified by like reference numerals.

FIG. 1 shows a first sheet of material 10 formed in a continuous strip. The material has a first side 12 and a second side 14. An adhesive, such as a silicon adhesive, is provided as a coating on the first side 12. The strip of material shown in FIG. 1 is, essentially, a strip of tape. The strip can be made of paper, polyester, vinyl, lead foil, aluminum foil, or any other material suitable for a particular masking purpose.

Figure 2:
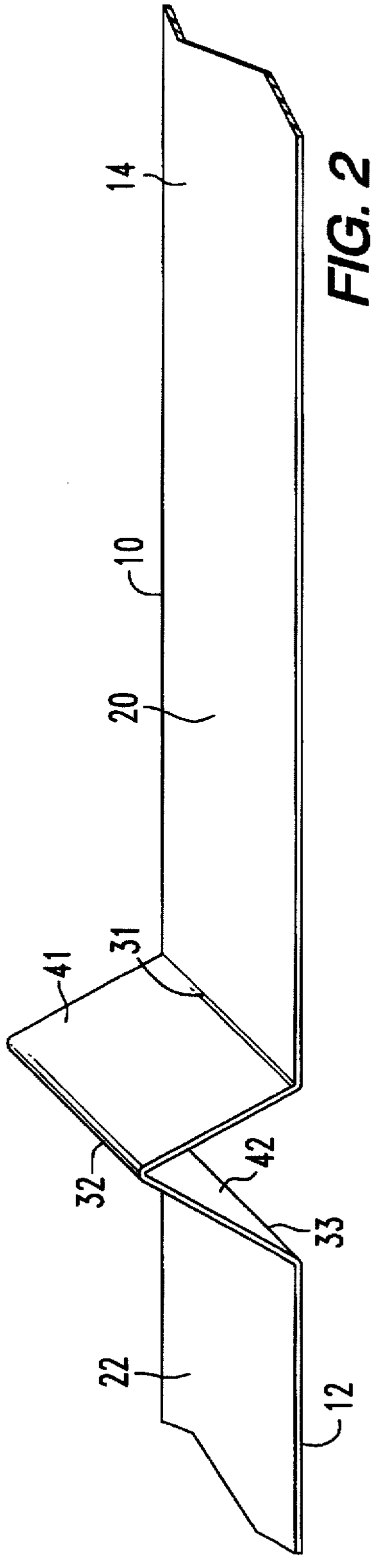

FIG. 2 shows the same strip of material illustrated in FIG. 1. As the strip 10 moves in a direction from left to right in FIG. 2, the portion of the strip identified by reference numeral 20 can be momentarily stopped by automatic machinery while the portion identified by reference numeral 22 continues to move from left to right in the figure. This will cause an excess of material to be accumulated between positions 20 and 22. This accumulation or build-up can be directed to follow a certain path which is upward in FIG. 2. Through the use of machinery well known to those skilled in the art for folding paper and other sheet materials, a first fold 31, a second fold 32, and a third fold 33 are formed. These three folds define two portions, 41 and 42.

Figure 3:
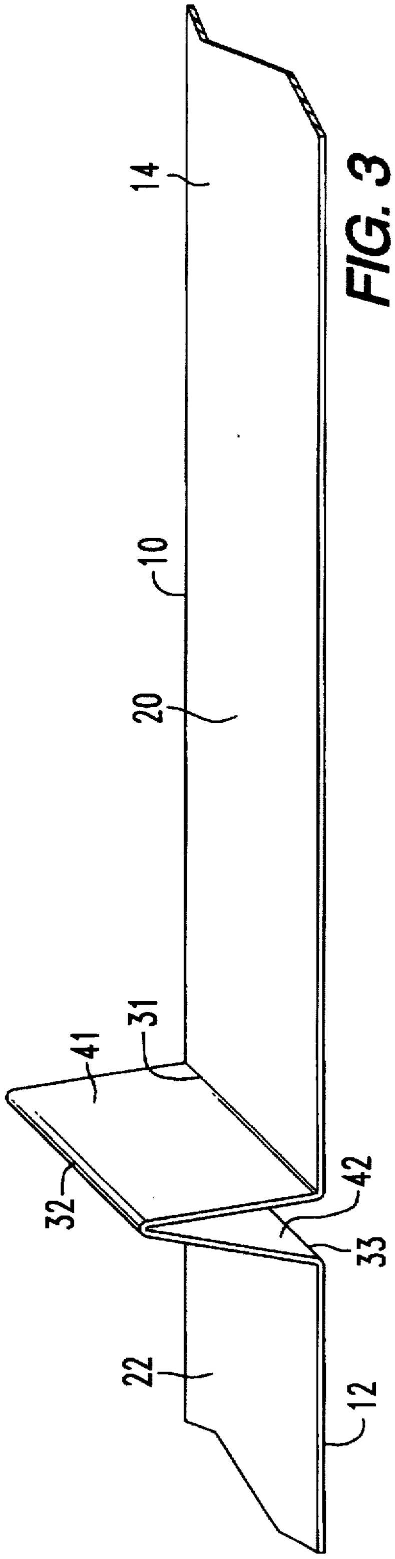

FIG. 3 shows the strip 10 a brief time later after the folding procedure described above in conjunction with FIG. 2. With portion 22 moving from left to right relative to portion 20, segment 41 and segment 42 move more closely together as the tape 10 continues to bend at bend line 32. Eventually, segment 41 and segment 42 will touch and the adhesive coating will adhere the two segments together.

Figure 4:
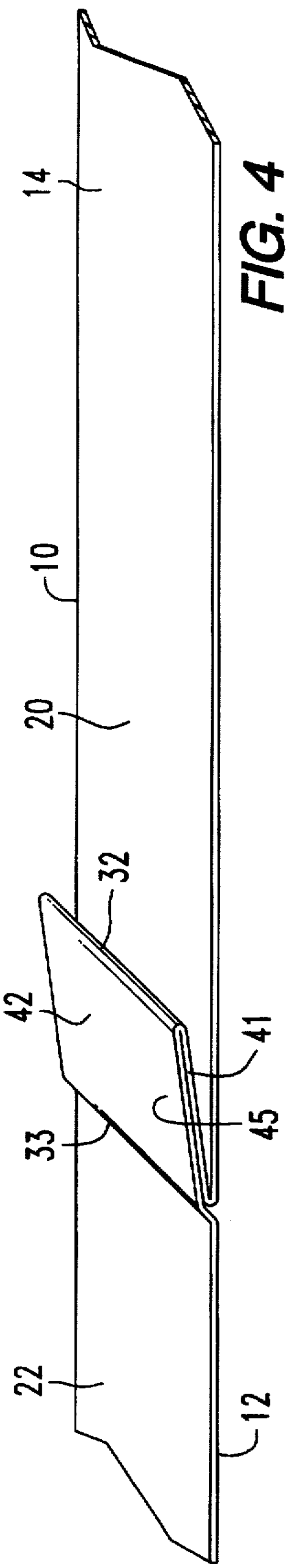
FIG. 4 shows an extension, or pleat, of a strip of material folded to be generally parallel to the strip.

FIG. 4 shows the strip 10 after segments 41 and 42 are in contact with each other to form a pleat 45. The pleat 45 is an extension from the generally planer unfolded portions of the strip 10.

Figure 5:
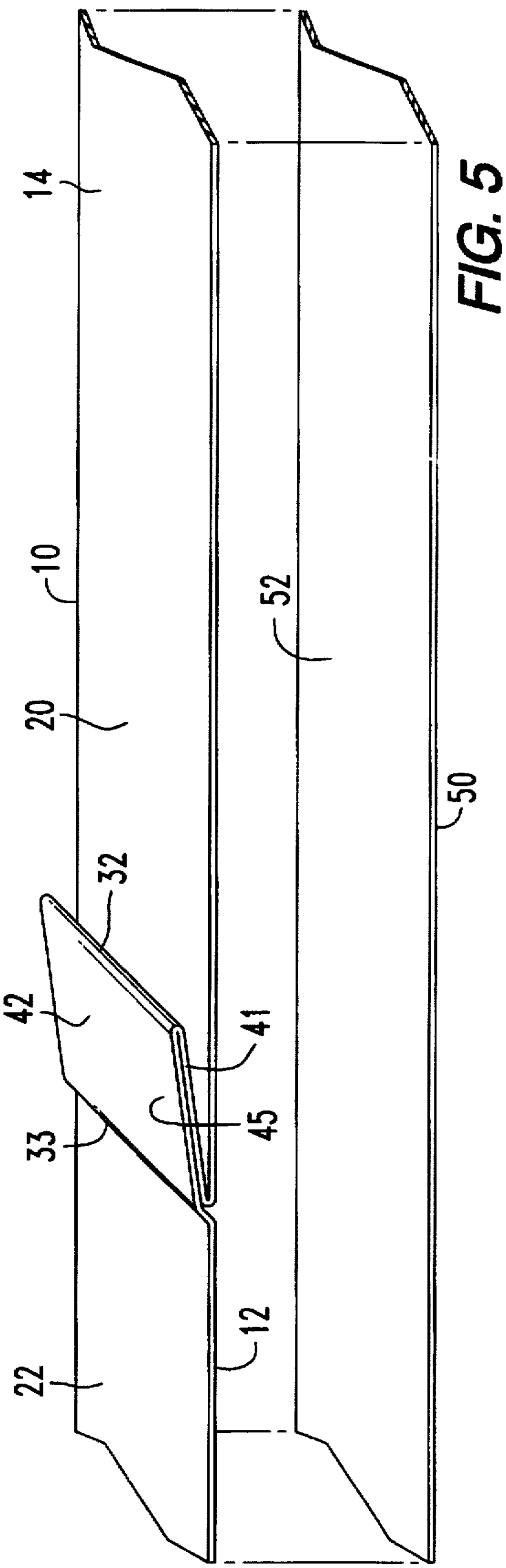
FIG. 5 shows the strip of material being attached to a backing sheet for storage and shipment.

FIG. 5 shows the strip 10 with its pleat, or extension 45, extending from the generally planer unfolded portion of the strip 10. In addition, a backing sheet 50 is illustrated. The backing sheet 50 can be made of a waxed paper or a paper otherwise treated to discourage permanent attachment of the adhesive layer on the first surface 12 to the backing sheet 50. The provision of a backing sheet is well known to those skilled in the art and has been used for transporting and storing adhesive devices. The strip 10 is placed against the backing sheet 50 with the adhesive on the first surface 10 being disposed in contact with the upper surface 52 of the backing sheet 50.

Figure 6:
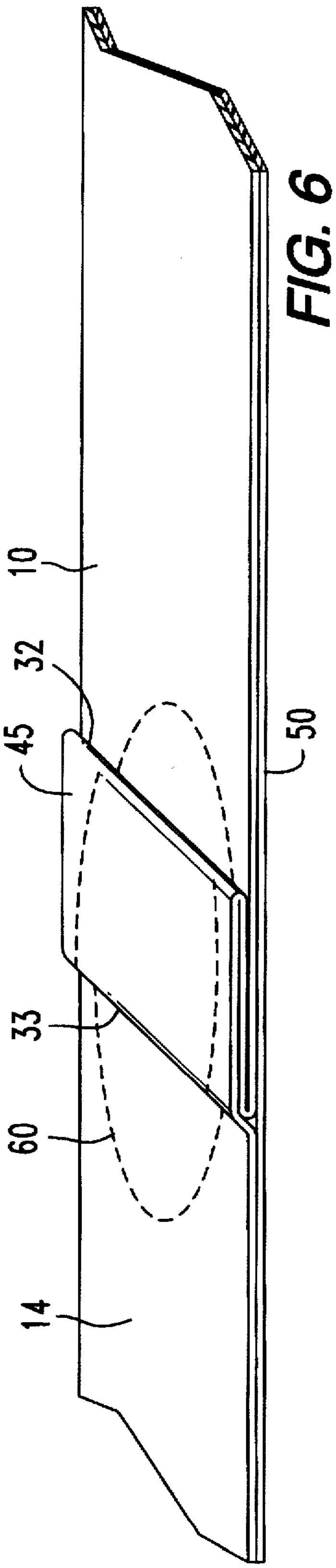
FIGS. 6 and 7 show a generally circular cut line along which a masking device is separated from surrounding material after the material of the masking device is attached to a backing sheet.

FIG. 6 shows the strip 10 attached to the backing sheet 50 with the pleat 45, or extension, folded down to be generally parallel with the second surface 14 of the strip 10. Dashed line 60 represents a cut line where a punch is forced downward against the strip of the first material to a depth generally equal to the thickness of the first material of the strip 10. The punching process is not intended to cut into or through the backing sheet 50.

Figure 7:
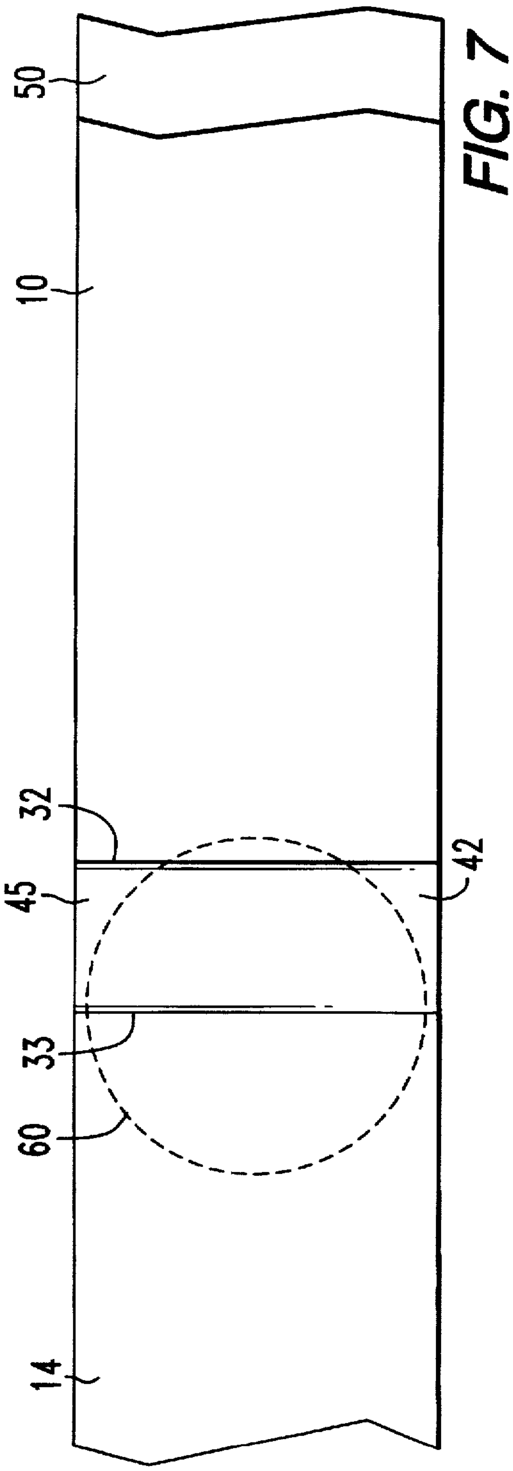

FIG. 7 is a top view of FIG. 6, showing the extension, or pleat 45, bend lines 32 and 33, and the cut line 60 which forms a circle in this example. It should be noted that the cut line 60 is located such that bend line 33 is approximately centered with the circle of the cut line. Although not absolutely necessary in every embodiment of the present invention, aligning bend line 33 with the center of the cut line 60 facilitates the use of the extension as a handle to assist gripping the masking disc during use. The cut line 60 is punched through the thickness of the strip 10, which is generally between 0.001 and 0.003 inches. The cut line 60 also extends through the adhesive layer in most cases. However, the cut line 60 should not extend completely through the masking sheet 50, illustrated in FIG. 6, because one purpose of the masking sheet is to provide a carrier for a plurality of the masking discs. After the punching process that forms cut line 60, the portion of the strip 10 outside the dashed circle is removed, leaving only the portion of the strip within the dashed circle 60 attached to the backing sheet 50, which is illustrated in FIG. 6. This allows the masking disc to be retained on the backing sheet for storage and shipment prior to use.

Figure 8:
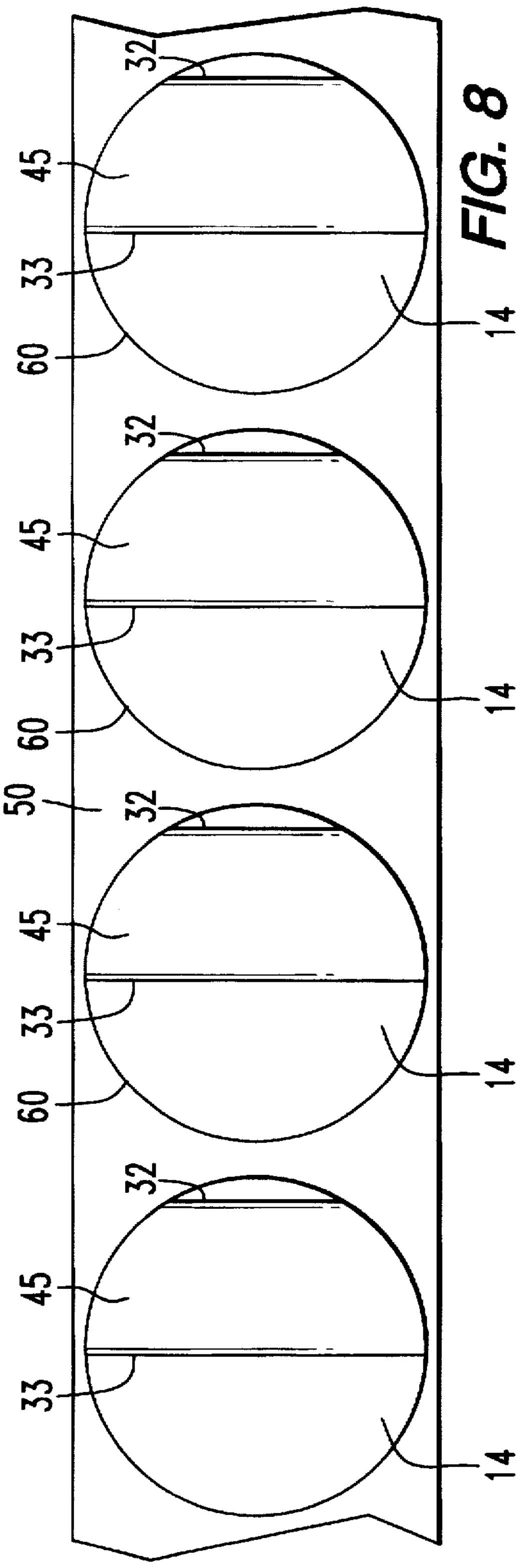
FIG. 8 shows several masking devices attached to a common backing sheet.

It should be understood that automated machinery would typically be used to manufacture large quantities of the masking disc attached to the backing sheet. After the cutting process and after the portions of the tape surrounding the dashed circle is removed, a plurality of masking discs would appear as shown in FIG. 8, all attached to a common backing sheet 50. Each of the masking discs would then comprise a first piece of material which is generally planer and attached to the surface of the backing sheet 50. Each masking disc would also comprise an extension portion that is defined by the pleat 45. The extension portion is moveable about bend line 33 so that is can be raised to a perpendicular configuration relative to the surface of the generally planer first piece of material that is removable attached to the backing sheet 50. This extension, when lifted away from parallel relation with the first piece of material, serves as a handle that can be grasped with two fingers by an operator for the purpose of lifting it away from the backing sheet 50. Using the same handle, the masking disc can be pressed against a surface that is to be protected during a subsequent painting or coating process. Following that process, the same handle can be used to easily remove the masking disc from the surface that had been protected during the process. During these procedures, removal and application of the masking disc is significantly facilitated by the handle.

Figure 9:
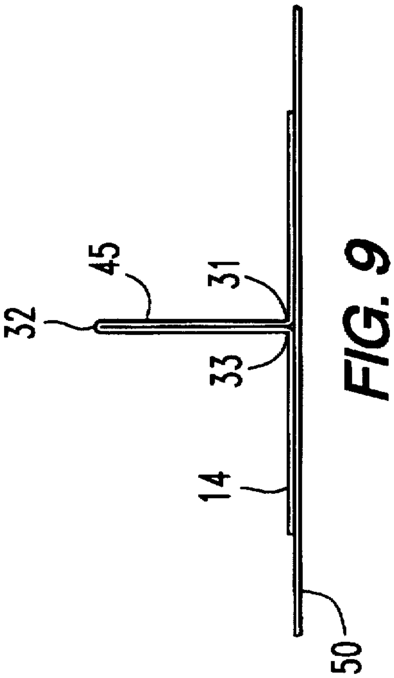

In order to further illustrate the concept of the present invention, FIG. 9 shows a side view of one masking disc with the extension 45 extended generally perpendicularly to the first piece of material. The extension 45 extends away from the second surface 14 of the first material and allows an operator to grasp the extension, as a handle, in order to lift it away from the backing sheet 50. It should be understood that the adhesive coating on the first surface of the first piece of material is disposed between the first piece of material and the backing sheet 50. The extension 45 can be folded down against the second surface 14 during shipping and storage, but can be raised to the position shown in FIG. 9 in order to facilitate its removal from the backing sheet and its subsequent removal from the surface to which it was adhered for the purpose of protecting that surface.

Figure 10:
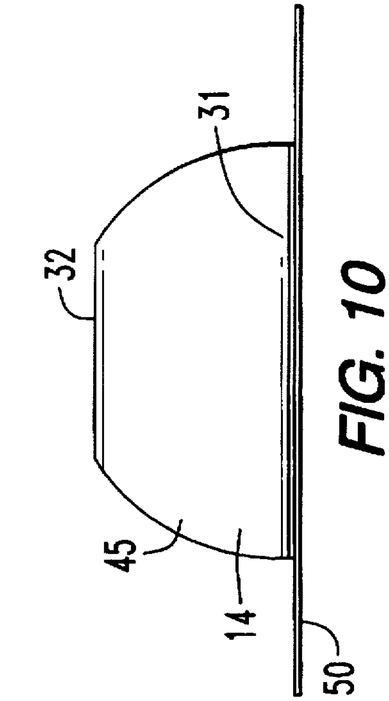
FIGS. 9 and 10 show two views of a masking device made in accordance with the present invention.

FIG. 10 is a view of the present invention which is perpendicular to the view of FIG. 9. The extension 45 is shown extending from the second surface 14 of the first piece of material. As in FIG. 9, the first surface of the first piece of material, which has an adhesive coating, is disposed in contact with the upper surface of the backing sheet 50.

Figure 11:
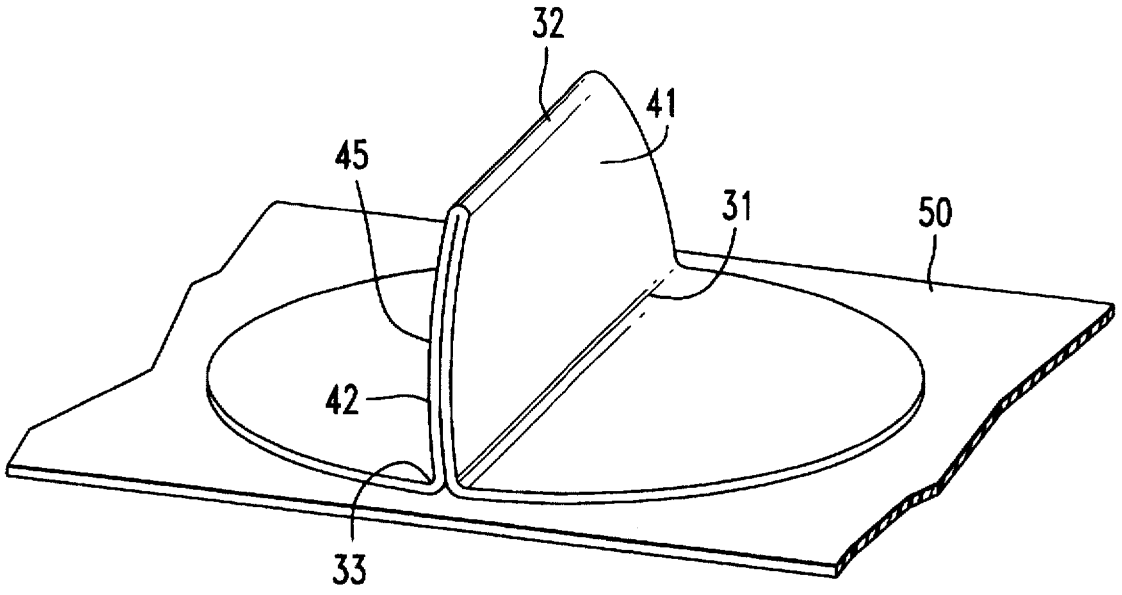
FIG. 11 is a perspective view showing one masking device attached to a backing sheet.

FIG. 11 shows a perspective view of one masking device attached to a backing sheet 50. The first piece of material lies generally flat on the backing sheet 50 and is attached to the backing sheet 50 by a layer of adhesive on its first surface. The extension 45, which comprises the segments 41 and 42 and which is defined by the pleat formed by bend lines 31, 32 and 33, is shown extending upward in a generally perpendicular direction from the first piece of material. As can be seen, the extension 45 serves as a convenient handle to allow an operator to grasp the masking device and lift it away from the backing sheet 50 without having to touch any portions of the adhesive layer. This is important because, in addition to being difficult to remove from the backing sheet and the equipment to which it is attached during use, masking discs made according to the prior art also are susceptible to having grease, oil and other contaminants placed on the adhesive surface by an operator during the removal process from the backing sheet. If oils and grease contaminate the adhesive layer, the masking device might not adhere properly to the surface for which it is intended to provide protection during a painting or coating procedure. If this occurs, edges of the masking device can lift away from the protected surface and paint can be sprayed or flowed onto the protective surface.

As described above, the present invention provides a convenient handle for removing and applying the masking disc to its backing sheet or a surface to be protected. Although the present invention has been illustrated to show one particular shape (i.e. a circle) of masking discs, it should be understood that many alternative shapes can also be provided. Since the shape of the masking device is determined during the punching process described above in conjunction with FIGS. 6 and 7, the shape of the dashed line defining the cut region can be virtually any shape. Since the pleat which forms the handle is created prior to the cutting process, the shape of the cut line will not adversely affect the present invention along as some extension remains after the cutting process is completed.

It should be understood that the materials selected for the masking device is not limiting to the present invention. Virtually any material that can be used for the purpose of masking a surface can be adapted for use to manufacture the present invention. In addition, the specific type of adhesive is also not limiting to the present invention since virtually any type of adhesive can be used in accordance with the description above. Furthermore, the backing sheet is not a limitation to the present invention since virtually any type of backing sheet known to those skilled in the art can be implemented for the purpose of storage and shipment of the present invention in large quantities.

I claim:

1. A masking device for covering a preselected portion of a material surface, comprising:

a sheet of material having an adhesive attached to a first side thereof; and an extension formed by folding a first piece of material to form a pleat extending from an unfolded portion of a second side of said sheet of material and by causing adhesive surfaces of two adjacent segments of said extension to adhere to each other, said extension allowing said masking device to be gripped.

2. The device of claim 1, further comprising:

a second piece of material attached to said first side of said sheet of material by said adhesive, said sheet being removably adhered to said second piece of material.

3. The device of claim 1, wherein:

said first piece of material is made of a polyester.

4. The device of claim 1, wherein:

said first piece of material is made of paper.

5. The device of claim 1, wherein:

said first piece of material is made of lead foil.

6. The device of claim 1, wherein:

said first piece of material is made of aluminum foil.

7. The device of claim 1, wherein:

said first piece of material is made of Teflon.

8. The device of claim 1, wherein:

said adhesive is a silicone adhesive.

9. The device of claim 1, wherein:

said first piece of material and said sheet of said material are portions of an integral piece of material.

10. A masking device for covering a preselected portion of a material surface, comprising:

a sheet of material having an adhesive attached to a first side thereof; and an extension formed by folding an integral portion of said sheet of material to form a pleat extending from an unfolded portion of a second side of said sheet of material, said adhesive of said first side of said sheet causing two adjacent segments of said extension to adhere to each other, said extension allowing said masking device to be gripped.

11. The device of claim 10, further comprising:

a second piece of material attached to said first side of said sheet of material by said adhesive, said sheet being removably adhered to said second piece of material.

12. The device of claim 10, wherein:

said first piece of material is made of a polyester.

13. The device of claim 10, wherein:

said first piece of material is made of paper.

14. The device of claim 10, wherein:

said first piece of material is made of lead foil.

15. The device of claim 10, wherein:

said first piece of material is made of aluminum foil.

16. The device of claim 10, wherein:

said first piece of material is made of Teflon.

17. The device of claim 10, wherein:

said adhesive is a silicone adhesive.

* * * * *